Figure 1:
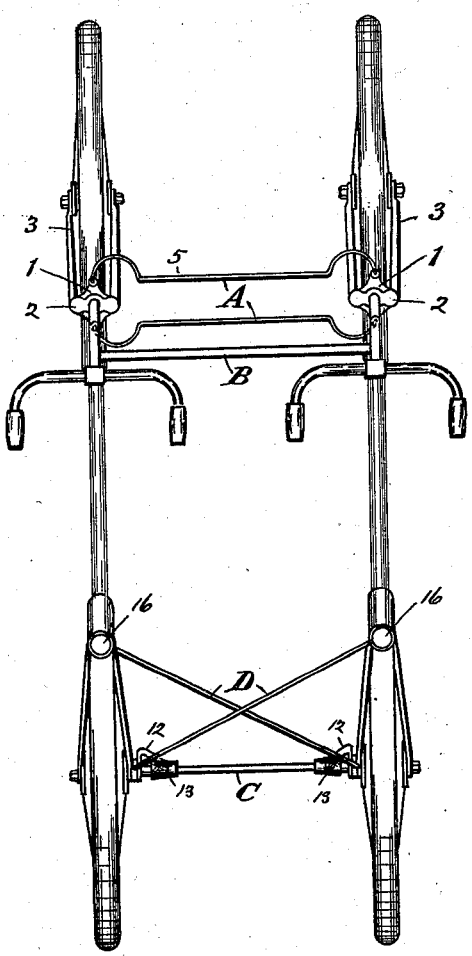

No. 707,122. Patented Aug. 19, 1902.
J. KYNASTON.
DEVICE FOR COUPLING TWO BICYCLES.
(Application filed Mar. 20, 1902.)

(No Model.) 3 Sheets—Sheet 1.

WITNESSES
Conrad C. Locke.
John W. Barnes

INVENTOR
John Kynaston
By James A. Coulbrough
Attorney

No. 707,122. Patented Aug. 19, 1902.
J. KYNASTON.
DEVICE FOR COUPLING TWO BICYCLES.
(Application filed Mar. 20, 1902.)
(No Model.) 3 Sheets—Sheet 2.
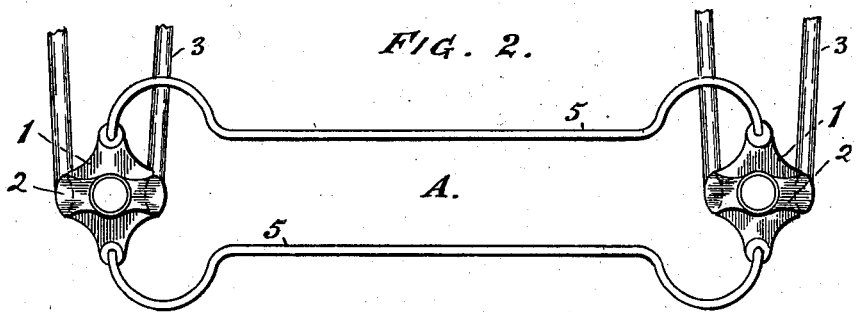
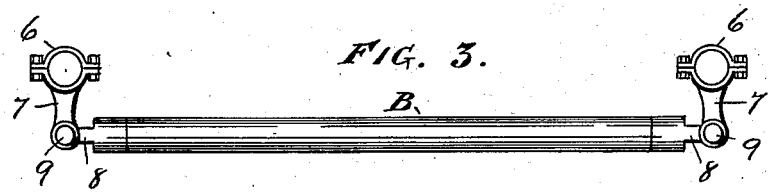
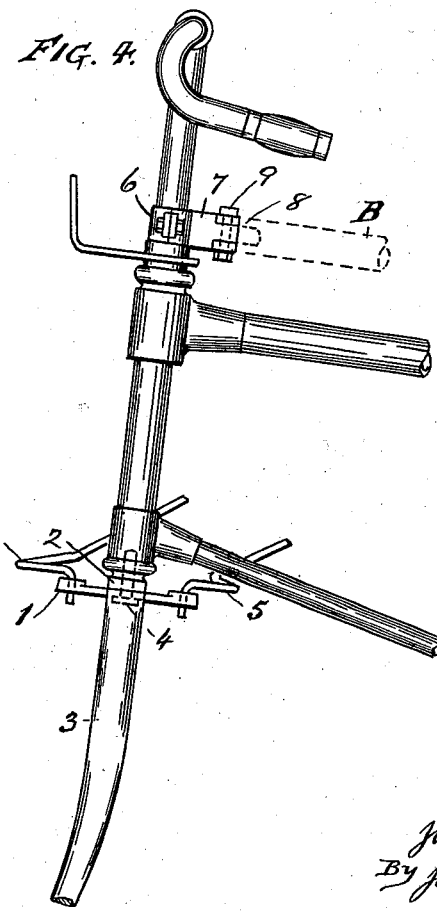
WITNESSES
Conrad C. Locke.
John W. Barnes
INVENTOR
John Kynaston
By James A. Coulrough
Attorney.

No. 707,122. Patented Aug. 19, 1902.
J. KYNASTON.
DEVICE FOR COUPLING TWO BICYCLES.
(Application filed Mar. 20, 1902.)
(No Model.) 3 Sheets—Sheet 3.
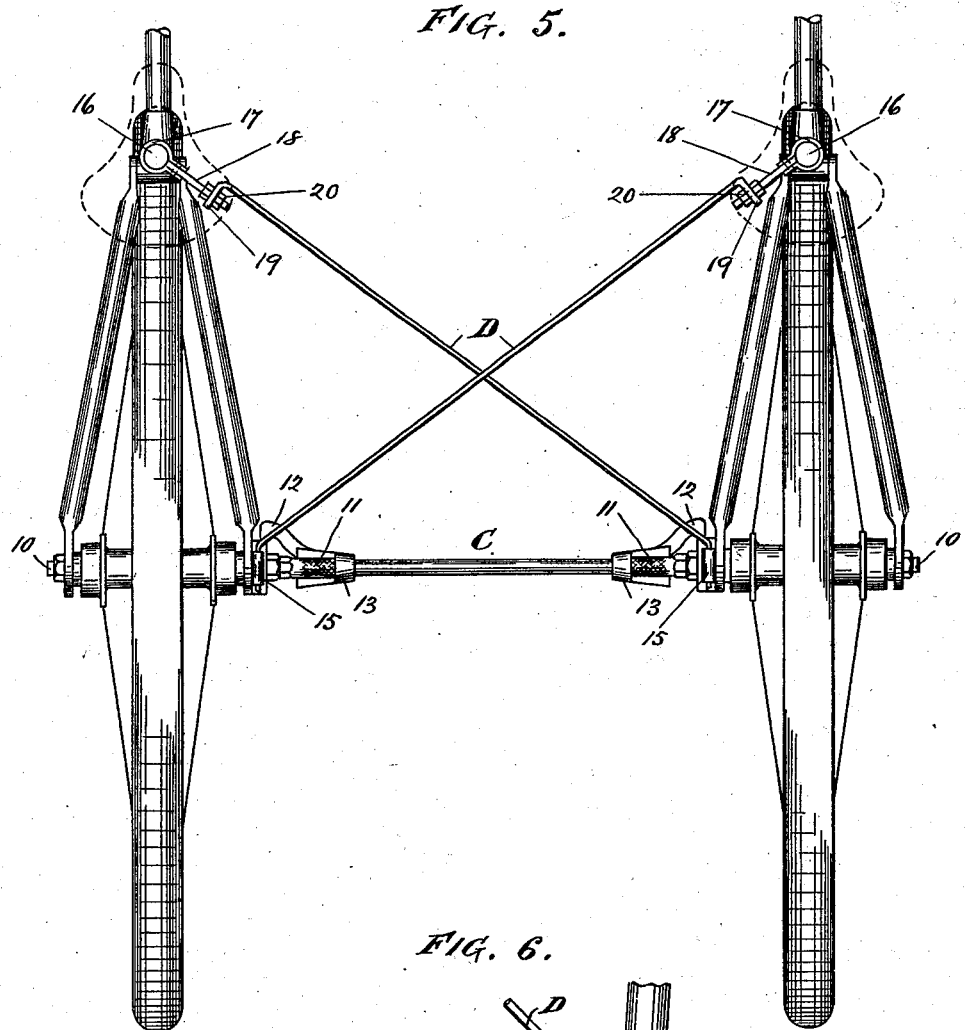
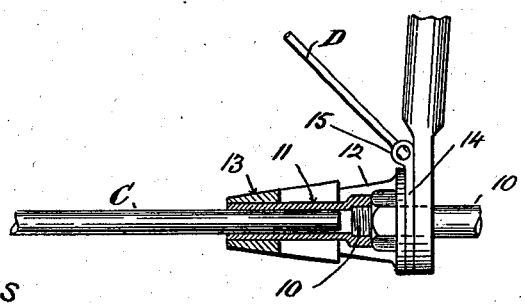
WITNESSES
Conrad C. Locke.
John W. Barnes
INVENTOR
John Kynaston
By James A. Coubrough
Attorney

UNITED STATES PATENT OFFICE.

JOHN KYNASTON, OF LIVERPOOL, ENGLAND.

DEVICE FOR COUPLING TWO BICYCLES.

SPECIFICATION forming part of Letters Patent No. 707,122, dated August 19, 1902.

Application filed March 20, 1902. Serial No. 99,171. (No model.)

*To all whom it may concern:*

Be it known that I, JOHN KYNASTON, a subject of the King of Great Britain and Ireland, residing at 70 Hope street, Liverpool, England, have invented a new and useful Improvement in Devices for Coupling Two Bicycles, of which the following is a specification.

The present invention relates to means for coupling two bicycles side by side, whereby they form, in effect, a four-wheeled carriage. Such means comprise certain struts and stays reaching from one bicycle to the other and certain adjustable or hinged fixings by which these struts and stays are attached to the bicycles.

In the annexed drawings, Figure 1 is a plan of two bicycles coupled according to this invention. Fig. 2 illustrates in plan a parallel movement attached to the front-fork crowns. Fig. 3 illustrates in plan a yoke hinged to brackets clipped upon the handle-bar stems. Fig. 4 is a side elevation of the head of one bicycle, showing the parallel movement and yoke-bracket before referred to. Fig. 5 is a plan view of the rear wheels and forks of the bicycles, showing the strut connecting the rear axles and the diagonal stays which tie the rear axle of one bicycle to the saddle-pillar of the other bicycle. Fig. 6 is a detail of part of Fig. 5.

The parallel steering movement A comprises two plates 1 1, which are attached to and underneath the crowns 2 2 of the front forks 3 3 by a central stud 4. These plates 1 1 project backwardly and forwardly, and in these projecting parts are swiveled the ends of the parallel guide-rods 5 5. By means of this parallel movement the steering movements of the two forks will be identical. The plates 1 1 may remain as fixtures, the guide-rods being readily removed.

The yoke B performs two functions—namely, it retains the two steering-heads in a parallel position vertically and it serves as a secondary or supplementary steering-gear. To the stem of each handle-bar is clipped a bracket 6, and on each of these brackets 6 6 is formed a socket for a swivel-pin. This socket is formed on the end of a neck 7, which forms a steering-lever. Each pen of the yoke B possesses a jaw 8, which is swiveled to the neck 7 by the pin 9. If desired, the necks 7 7 of the brackets 6 6 may be turned around in alinement with each other, a shorter yoke being then used, so that the yoke merely serves as a distance-keeper and not as a supplementary steering-gear.

The rear parts of the bicycles are coupled by means of the strut C and the diagonal stay-rods D. Screwed upon the projecting end of the rear axle 10 is the bicycle-step 11. (Shown more clearly in the detail Fig. 6.) This step is hollow and receives the end of the strut C. The strut ends may be screwed with right or left hand threads into these steps 11; but I find it sufficient for the purpose to merely slide them therein. A bracket 12, secured on the rear axle, possesses a sleeve 13, which slips over the step 11 and so stiffens the latter against any twisting strain. Also secured on the rear axle is a washer 14, possessing an eye 15, which eye receives the hooked end of a stay D. These stays D reach from the rear axles to the seat-pillars 16. To these pillars are attached the clips 17, and in these clips are swiveled the eyebolts 18. The upper ends of the stays D possess eyes 19 to receive the bolts 18, the stays being tightened by the nuts 20.

Having now described my invention, what I claim as new, and desire to secure by Letters Patent, is—

In combination the plates 1 attached to the front-fork crowns, the guide-rods 5 forming with said plates a parallel steering movement, the yoke B hinged to brackets 6 clipped on the handle-bar stems, the strut C socketed in foot-steps on the rear axles, and the stays D hooked in eye-washers on the rear axles and attached by the tightening bolts and nuts 18, 20, to the clips 17 attached to the seat-pillars 16, forming a coupling for two bicycles, as described.

JNO. KYNASTON.

Witnesses:
JAMES A. COUBROUGH,
JOHN H. SMITH.